Nov. 16, 1971  E. ILGEN ET AL  3,619,854
PROCESS FOR SHIRRING ARTIFICIAL SAUSAGE CASINGS
Filed Sept. 29, 1967
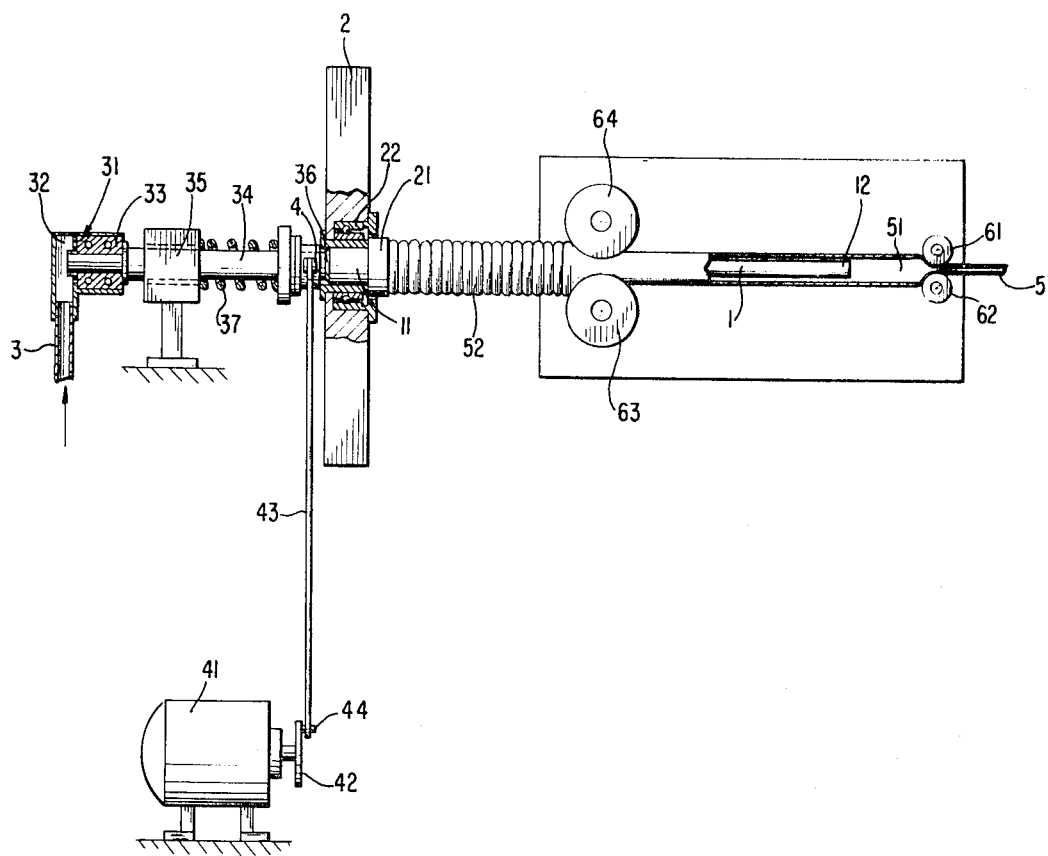
INVENTORS
ERICH ILGEN
HORST MICHL
BY James E. Bryan
ATTORNEY > United States Patent Office 3,619,854
Patented Nov. 16, 1971

3,619,854
PROCESS FOR SHIRRING ARTIFICIAL
SAUSAGE CASINGS
Erich Ilgen, Niedernhausen, and Horst Michl, Wallau, Germany, assignors to Kalle Aktiengesellschaft, Wiesbaden-Biebrich, Germany
Filed Sept. 29, 1967, Ser. No. 671,866
Claims priority, application Germany, Oct. 1, 1966, K 60,371
Int. Cl. A22c 3/00
U.S. Cl. 17—42                                    4 Claims

ABSTRACT OF THE DISCLOSURE

This invention relates to a process and apparatus for shirring a sausage casing, which process comprises slipping the casing over a mandrel rotating to and fro while maintaining an internal gas pressure in the casing, and compressing the casing against a stop with the formation of pleats.

---

It is known to compress artificial sausage casings in their longitudinal direction with the formation of pleats. This is done in order to be able to apply long length sections of a sausage casing in a simple manner to the stuffing horn through which the sausage meat is to be forced into the casing. In the processes used in practice for shirring artificial sausage casings, the casings are slipped onto a mandrel while maintaining an internal gas pressure, the slipping-on being terminated by compressing the casing against a stop so that it is longitudinally shirred with the formation of pleats. For maintaining the internal gas pressure, the gas is generally blown through the mandrel over which the sausage casing is slipped and upon which it is shirred. For obvious reasons, the gas employed is air. The outer diameter of the mandrel is somewhat larger than that of the stuffing horn to be used later for filling the sausage casing, so that the shirred sausage casing can be mounted onto the stuffing horn. The sections of sausage casing shirred according to the known processes, often also referred to as "sticks," possess an interior cohesion of remarkable strength. This is a very desirable property because it prevents the shirred pleats of the casing from separating when the sticks are being handled.

As has now been found, sticks of shirred sausage casings having a still better internal cohesion may be produced according to the above described shirring processes by rotating the mandrel to and fro about its axis in relation to the sausage casing being slipped thereon.

The number of to and fro rotations to be made by the mandrel depends, inter alia, on the other process conditions. The most favorable number, however, can be easily and quickly determined by means of tests. The larger the diameter of the sausage casing to be shirred, the smaller is the number of the mandrel to and fro rotations yielding the best results. Generally, a noticeable improvement of the internal cohesion is obtained by causing the mandrel to make 4 to 35 to and fro rotations while 1 meter of sausage casing is slipped thereon. Every to and fro rotation of the mandrel advantageously corresponds to a rotation of the mandrel through 20 to 40°, i.e. a deviation of 10° to 20° from the central position to both directions of rotation. A very favorable result was achieved, for example, with a sausage casing of a diameter of 50 mm. when the casing was slipped over the mandrel at a speed of 180 m. per minute and the mandrel performed 1,200 to and fro rotations of about 30° to 35° per minute. With a sausage casing of a diameter of 18 mm., favorable results were achieved at a travel speed of 180 m. per minute when the mandrel performed 5,000 to and fro rotations of 25° to 30° per minute.

The process of the present invention advantageously is used in combination with shirring processes in which the force causing the shirring effect acts simultaneously and continuously on opposite points of the sausage casing. Such a process is described, e.g., in German patent specification No. 1,192,072, and other processes of this type are described in U.S. Pats. Nos. 3,142,861, and 3,231,932.

The invention will be further described by reference to the accompanying drawing which shows in a schematic manner one embodiment of a device in operation for performing the process of the application.

In the device shown in the drawing, the left end 11 of a hollow mandrel 1 is rotatably supported by a ball bearing 22 in a plate 2 having a stop 21 thereon through which the hollow mandrel 1 passes. Air is fed from a flexible hose 3 into the mandrel 1 and escapes from the right end 12 thereof into the interior of a still unshirred portion 51 of the sausage casing 5, which is taken from a supply roll (not shown) and fed between a pair of squeeze rollers 61 and 62, and between the pair of shirring rollers 63 and 64, from which the casing is forced against the stop 21 or the portion 52 of a previously shirred sausage casing, respectively, whereby the portion of shirred sausage casing grows until the desired length is obtained. In order to comply with the growth of portion 52 of shirred sausage casing, the distance between stop 21 and shirring rollers 63 and 64 is extended correspondingly. To this end, the pair of shirring rollers 63 and 64 and the pair of squeezing rollers 61 and 62 are mounted as a unit on a slide (not shown) which allows them to move during the shirring period away from stop 21, in accordance with the growth of the portion 52 of shirred sausage casing, and to move back to their starting positions during the interval between two shirring periods.

While the sausage casing is shirred in the above-described manner, air enters the unshirred portion 51 of the sausage casing, which is limited by the pair of squeeze rollers 61 and 62 and the shirred portion 52, to blow up the sausage casing to its full dimension so that the shirring rollers 63 and 64 can grip the sausage casing with the desired firmness and the shirring folds are given the desired shape.

For feeding the air from the flexible hose 3 into the rotatable mandrel 1, a rotor coupling 31 is intercalated, to the stator 32 of which the flexible hose 3 is connected and to the rotor 33 of which an intermediate line 34 is joined. The latter is rotatably and shiftably supported in a bearing 35 and connected in an air-tight manner to the end of the mandrel 1 by means of a coupling 36, the mating surfaces of which are pressed against each other by a spring 37. If one wishes to disconnect coupling 36, the intermediate line 34 is shifted in the bearing 35 against the pressure exerted by the spring 37.

During the shirring periods, the mandrel 1 is rotated to and fro about its axis by means of an electric motor 41, to the rotor 42 of which one end of a rod 43 is eccentrically connected by means of pivot 44. The other end of the rod 43 is joined to a pivot 4 which is eccentrically affixed to the intermediate line 34. As is known, the choice of appropriate eccentricities of the pivots 4 and 44 and the choice of an appropriate mutual arrangement of both eccentric pivots permits the transformation of the continuous unidirectional rotation of pivot 44 into a to and fro rotation of pivot 4. Coupling 36 serves not only for an air-tight connection of the intermediate line 34 to the mandrel 1 but also serves for a transfer of the to and fro rotation of the intermediate line 34 to the mandrel 1. To this end, the coupling 36 is constructed to be at the same time a friction coupling.

The process according to the present invention causes a considerable improvement of the stiffness in the bends of the stick formed from the shirred sausage casing. Apparently, this is due to the fact that in the known shirring processes mentioned above the sausage casing is jammed onto the mandrel by the shirring process so that, when the mandrel rotates to and fro in accordance with the present invention, the already shirred portion of the casing must join in this rotational movement, thus preventing the formation of longitudinal zones of reduced internal cohesion in the stick of shirred sausage casing.

A similar effect may also be achieved by causing the mandrel to perform, instead of the to and fro rotations, a rotary movement in one direction, but such a process is not the object of this application. The process of this application involves the further advantage that the stick obtained has a straight and not a curved form. This is an advantage which permits filling of the shirred sausage casings to an even greater extent by means of automatic machines.

It will be obvious to those skilled in the art that many modifications may be made within the scope of the present invention without departing from the spirit thereof, and the invention includes all such modifications.

What is claimed is:

1. A process for shirring a sausage casing which comprises slipping the casing over a mandrel rotating to and fro while maintaining an internal gas pressure in the casing, and compressing the casing against a stop with the formation of pleats.

2. A process according to claim 1 in which force causing compression of the casing with pleat formation is caused to act simultaneously and continuously on opposite points on the sausage casing.

3. Apparatus for shirring a sausage casing which comprises a mandrel, means for rotating the mandrel to and fro, means for maintaining an internal gas pressure in a casing on the mandrel, and means for compressing the casing on the mandrel against a stop with the formation of pleats.

4. Apparatus according to claim 3 in which the means for compressing the casing includes a pair of shirring roll means mounted for translational movement relative to the stop.

References Cited

UNITED STATES PATENTS 3,142,861   8/1964   Reigler _____ 17—42

LUCIE H. LAUDENSLAGER, Primary Examiner

U.S. Cl. X.R.

17—45